April 4, 1961   B. DUBSKÝ ET AL   2,977,791
TORSIONAL MAGNETOSTRICTIVE PRESSURE PICK-UP
Filed Sept. 29, 1959

INVENTORS
Bořivoj Dubský, Oldřich Straka
Jiří Černohorský, Vladimír Koblížek

United States Patent Office 2,977,791
Patented Apr. 4, 1961

2,977,791

TORSIONAL MAGNETOSTRICTIVE PRESSURE PICK-UP

Bořivoj Dubský and Oldřich Straka, Prague, Jiří Černohorský, Mesice, near Prague, and Vladimír Koblížek, Prague, Czechoslovakia, assignors to Vyzkumny a zkusebni letecky ustav, Letnany, near Prague, Czechoslovakia Filed Sept. 29, 1959, Ser. No. 843,207

Claims priority, application Czechoslovakia Oct. 3, 1958

2 Claims. (Cl. 73—141)

The present invention relates to a torsional magnetostrictive pressure or force pick-up, which may be successfully used as a weighing device with a remotely located reading, registering or automatic relay circuit system.

There are many kinds of mechanical, hydraulic and electrical pick-ups. The main drawback of these existing pick-ups is a lack of accuracy even when such pick-ups are provided with a complicated electronics indicating system. Another important drawback of the existing pick-ups is the dependence of their indications on temperature.

The torsional magnetostrictive pressure or force pick-up embodying the present invention generally comprises a mechanism transforming a rectilinearly acting force into twisting of a ferromagnetic tube provided with excitation and pick-up circuits. It is apparent that a pressure dynamometer built on such a principle is extremely simple and does not require complicated and expensive mechanism, and further that it may be manufactured easily. Moreover it can endure severe handling in use.

Figure 1:
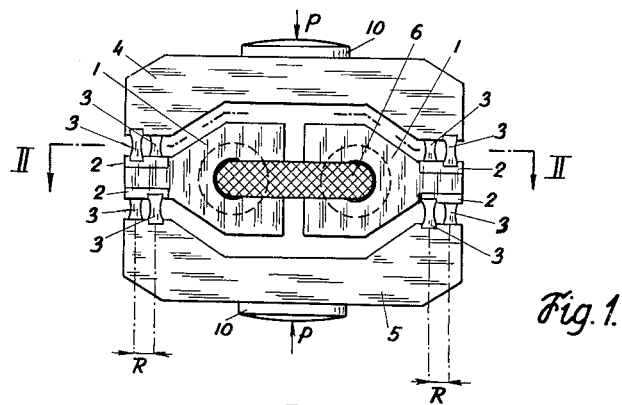
Figure 2:
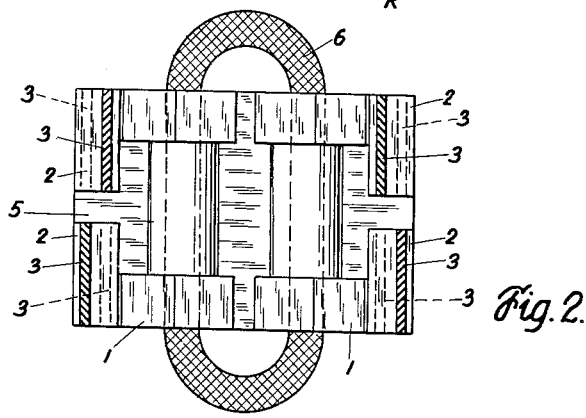
Figure 3:
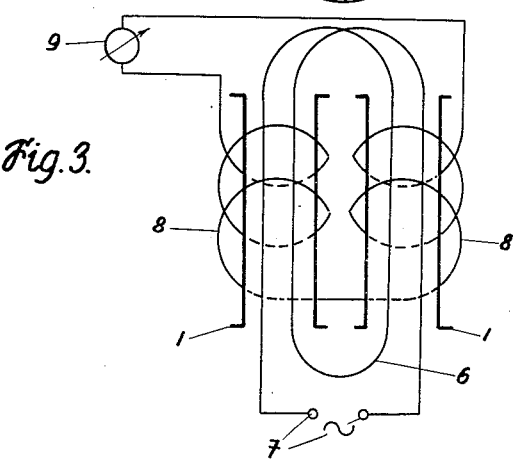

An embodiment of the invention is shown by way of example on the accompanying drawing where Fig. 1 is a front elevation of said pick-up, Fig. 2 is a cross section thereof along the line II—II of Fig. 1, and Fig. 3 is a wiring and winding diagram.

The illustrated pressure pick-up embodying the present invention comprises two parallel ferromagnetic torsional bodies 1, each in the shape of an elongated tube, with the ends thereof being provided with outwardly directed, radial arms 2. Upon each of said arms is fastened a pair of elastic webs 3 respectively extending upwardly and downwardly therefrom.

The upper and lower webs 3 of each pair are spaced from the axis of the related tubular torsional body 1 by distances which differ by the distance R (Fig. 1). At one end of the torsional bodies 1, the upper webs 3 are closer to the axes of the bodies 1 than the lower webs by the distance R and, at the other end of the torsional bodies, the lower webs are closer to the axes of the bodies 1 than the upper webs by the same distance R. Further, the upper and lower webs are connected to upper and lower plates 4 and 5, respectively, which generally lie in planes parallel to the plane containing the axes of the torsional bodies 1. The plates 4 and 5 have central lugs 10 extending therefrom and preferably formed with spherical end surfaces at which the force or load P to be sensed can be applied.

It will be apparent that the load P urging the plates 4 and 5 toward each other, or a tension load urging the plates apart, will produce force couples or torques which are applied to the opposite ends of the tubular torsional bodies 1 and which act in opposite directions so that the bodies 1 are torsionally stressed in opposite directions by the applied load. A toroidal winding connected to terminals 7 passes through both of the torsional bodies. On both torsional bodies 1 are freely set coils 8 connected to a meter or other device 9. The complete pressure pick-up may be housed in a casing (not shown) preventing possible damaging of said coils, and also eliminating the influence of outer magnetic fields. The casing may also permit the transmission of horizontal shifting forces which, however, shall not effect the twisting of said torsional bodies 1.

When loading the pressure pick-up by the force P, the torsional bodies 1 and stressed by way of the upper and lower plates 4 and 5, the webs 3 and the arms 2, with a torque $$M_{k1} = \frac{P}{4} \cdot R$$

An alternating current supplied to winding 6 from terminals 7 creates a normally cylindrical alternating magnetic field in torsional bodies 1, and that cylindrical alternating magnetic field is deformed into a helical magnetic field having a longitudinal component proportional to the loading of said pressure pick-up and inducing a corresponding voltage in pick-up coils 8 to operate the meter or other device 9. Said pick-up and exciting circuits may be mutually interchanged.

The described pressure pick-up has a relatively large output voltage which is independent of variations in the exciting current and temperature changes, and these characteristics contribute to a wide range of applications of said pressure pick-up which do not require amplifiers, voltage stabilizers and temperature compensating circuits.

The magnetostrictive pressure pick-up embodying the invention has already been applied to the weighing of melting charges in metallurgical works, measuring foreign pressures in rolling mill plants, measuring of earth pressure in mines, weighing and batching of loose materials on conveyer systems, preventing overloading of lifting devices, bridges and other similar mechanisms, weighing of loads in automobile and railway transports, and aircraft weighing and determining center of gravity thereof. Another very favourable property of the described magnetostrictive pressure pick-up is the possibility it affords of accurately and reliably transmitting its indication over large distances without requiring the use of electronics equipment.

What we claim is:

1. A magnetostrictive force sensing device comprising first and second generally parallel, spaced apart plates, a pair of parallel, ferromagnetic tubes disposed between said plates with the axes of said tubes lying in a plane which is generally parallel to the planes of said plates, arms extending radially from the opposite ends of each of said tubes in directions away from the other of said tubes, two elastic webs connected between each of said arms and said first and second plates, respectively, the webs connected between the arms at one end of said tubes and said first plate being closer by a predetermined distance to the axes of the related tubes than the webs connected between the arms at said one end of the tubes and said second plate, and the webs connected between the arms at the other end of said tubes and said first plate being further by said predetermined distance from the axes of the related tubes than the webs connected between the arms at said other end and said second plate so that a force applied to said plates to produce relative movement of the latter perpendicular to said planes of the plates causes torsional stressing of said tubes in opposite directions, a toroidal winding extending through both of said tubes, means for supplying exciting current to said winding so as to produce a normally cylindrical magnetic field in said tubes, with said field being deformed so as to have an axial component, upon said torsional stressing of the tubes, and pick-up coils extending around said tubes and having a voltage induced therein by said axial component of the magnetic field, which voltage is a function of the force applied to said plates.

2. A magnetostrictive force sensing device as in claim 1 wherein said plates have lugs projecting from the surfaces thereof which face away from each other, and said lugs have spherical end surfaces to receive the force to be sensed.

References Cited in the file of this patent
UNITED STATES PATENTS

| | | |
|---|---|---|
| 2,895,332 | Dahle et al. | July 21, 1959 |

FOREIGN PATENTS

| | | |
|---|---|---|
| 442,441 | Great Britain | Feb. 3, 1936 |
| 1,182,714 | France | Jan. 19, 1959 |